Jan. 30, 1968   C. J. GANTZER   3,365,981
COMBINED FLUID AND MECHANICAL DRIVE
Filed Dec. 28, 1964                               7 Sheets-Sheet 1

Inventor
Charles J. Gantzer
By Hofgren, Wegner,
Allen, Stellman & McCord
Attys

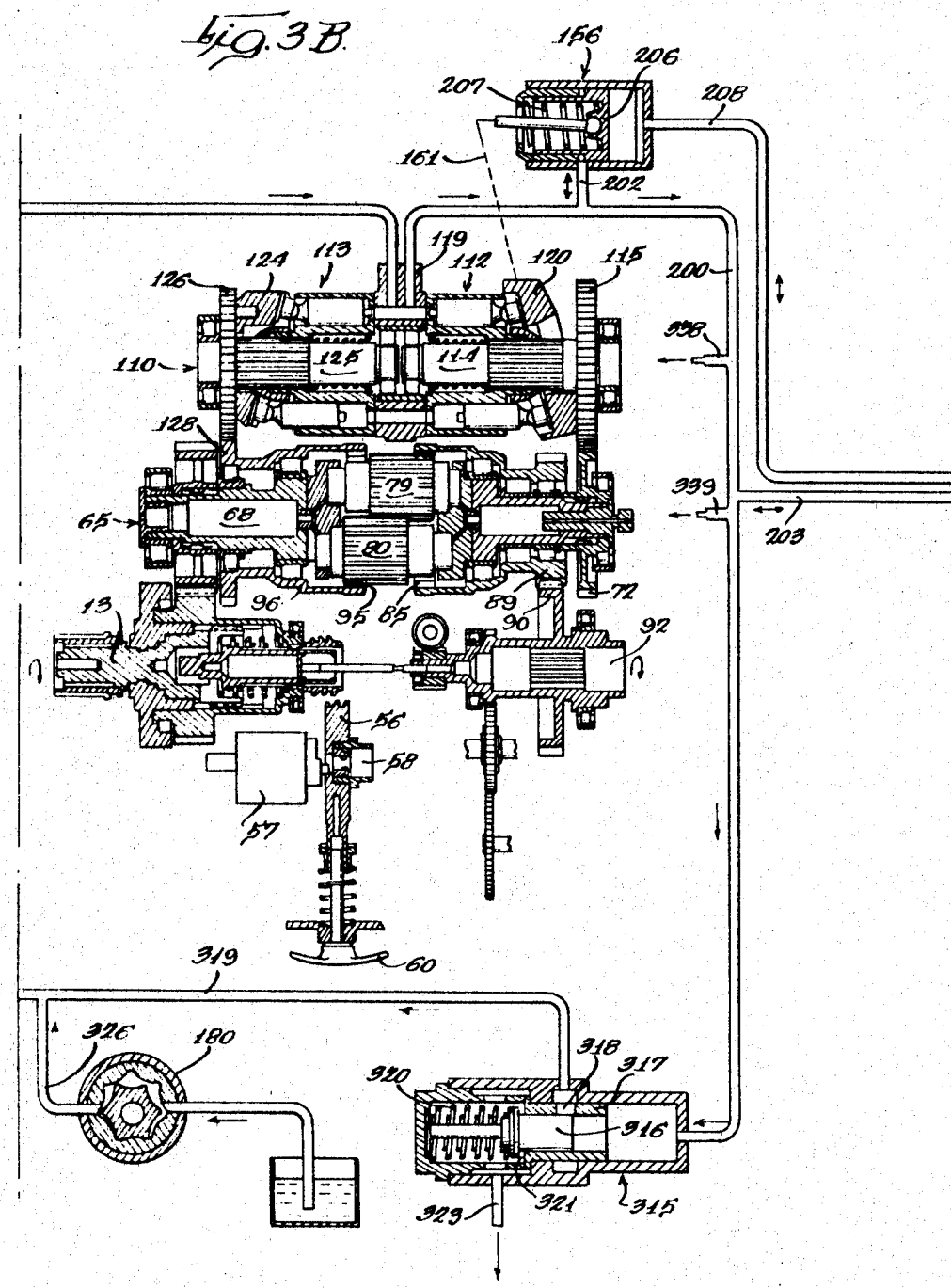

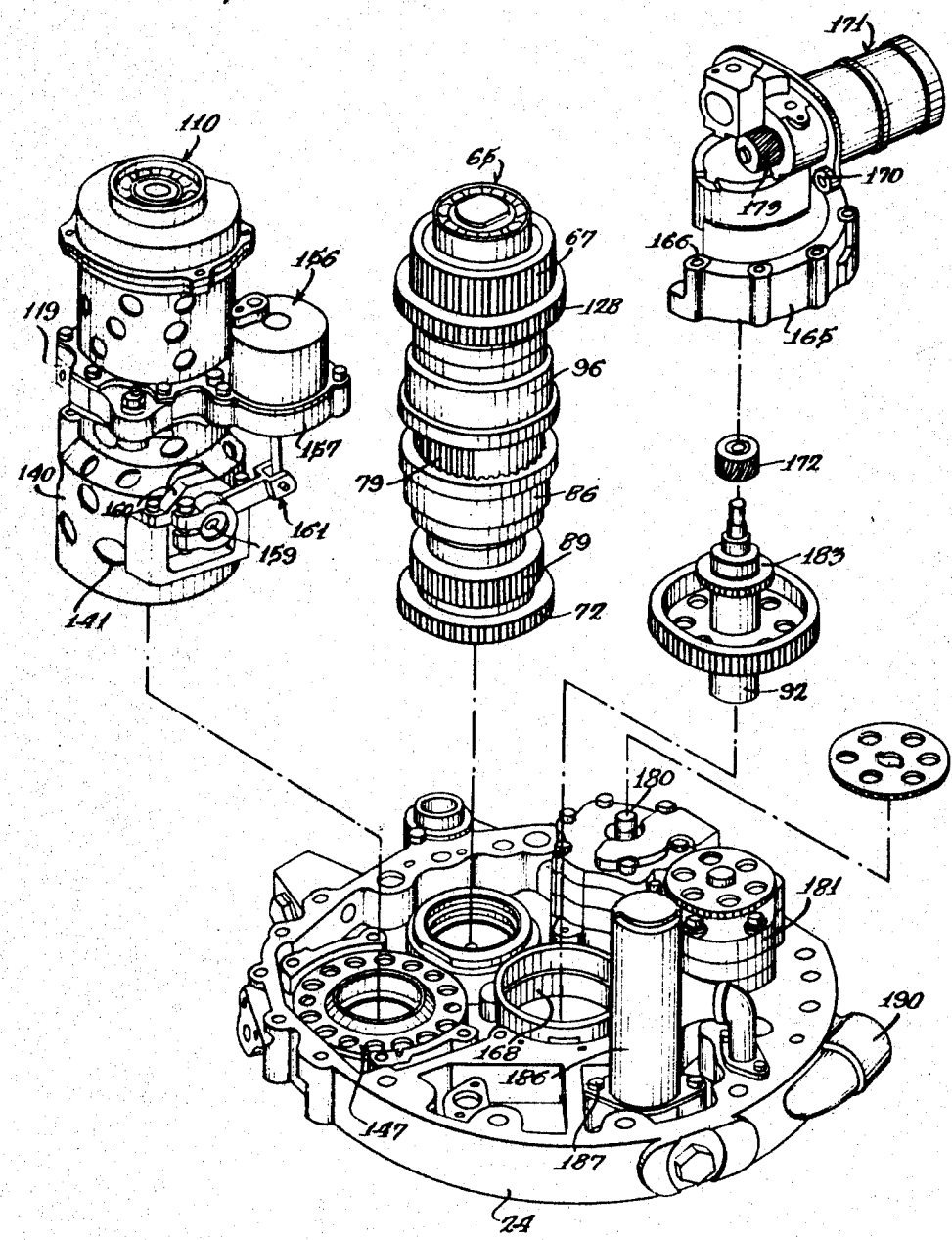

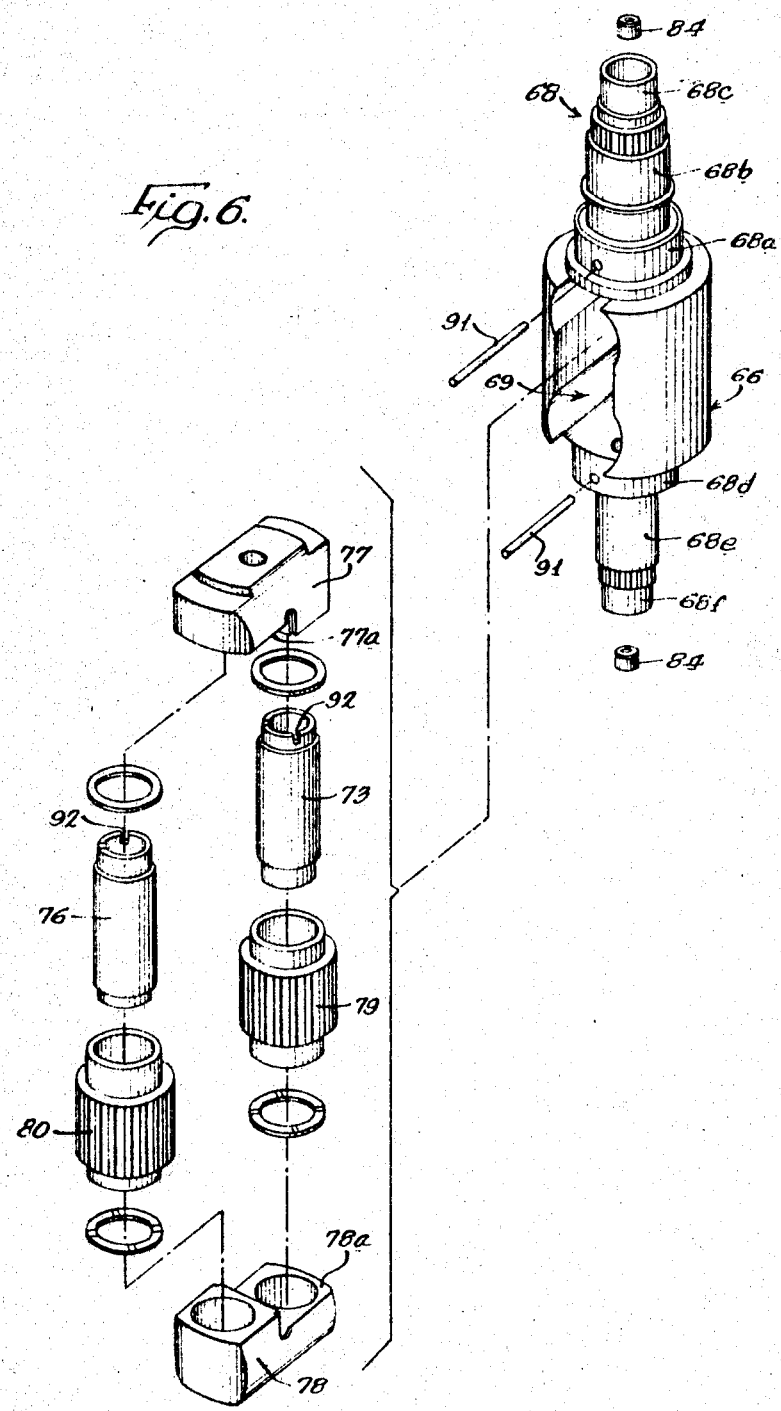

United States Patent Office 3,365,981
Patented Jan. 30, 1968

3,365,981
COMBINED FLUID AND MECHANICAL DRIVE
Charles J. Gantzer, Rockford, Ill., assignor to Sundstrand Corporation, a corporation of Illinois
Filed Dec. 28, 1964, Ser. No. 421,483
15 Claims. (Cl. 74—687)

This application relates generally to transmissions and more particularly to a constant speed transmission for driving a load requiring a substantially constant speed of rotation.

In the design of aircraft it is desirable to operate the aircraft accessories with a constant frequency source of electric power. A generator or alternator provided for this purpose must therefore be driven at a constant speed. An obvious source of mechanical power is the aircraft engine or engines. As aircraft engines usually have a wide speed range to accommodate the varying power requirements of take-off, landing and flight, a constant speed drive transmission driven by the engine and driving the alternator or generator must be provided to maintain a stable source of electric power for the aircraft's accessories. One problem often encountered in designing such a constant speed transmission is the confined envelope or space into which the constant speed transmission is mounted between the engine and the alternator or generator. In addition to this, the transmission must be capable of delivering considerable power to the alternator under varying environmental conditions and over a wide range of input speeds.

The present invention provides a transmission, the basic functional components of which are a mechanical differential between the input and the output shafts with a hydraulic drive interposed to rotate a control gear in the mechanical gear differential to add or subtract speed from the input shaft in order to obtain a constantly rotating output shaft to drive the alternator. The hydraulic drive consists of two back-to-back hydraulic units secured together as a separate subassembly. To achieve a space saving without any sacrifice in the power capabilities, both the hydraulic drive and the gear differential have a thin elongated shape and are located closely adjacent and parallel to one another in a housing for the transmission. A mounting plate on one end of the transmission housing, adapted to be mounted against the alternator or to be driven, has a mounting surface facing the interior of the transmission housing for supporting the elongated gear differential and the hydraulic drive and permitting them to be stacked thereon, in addition to other components, during the assembly of the transmission. Both the gear differential and the hydraulic drive are mounted at their other ends in a cover member at the opposite end of the housing from the mounting plate.

A governor control is provided for the hydraulic drive portion of the transmission to add or subtract speed from the mechanical differential to achieve a constant output speed. The transmission input shaft is driven by a source of power, drives an input gear in the gear differential and also rotates one of two hydraulic units which are each adapted to deliver and receive motive fluid from the other. The output from the other hydraulic unit is geared to a control gear in the differential to add or subtract speed from the speed of the input shaft. The governor controls the displacement of the input shaft connected hydraulic unit in a manner such that as the speed of the input shaft increases in the range below "straight through drive" the input shaft driven hydraulic unit acts as a pump to drive the other hydraulic unit which rotates the control gear in a direction to add speed to the input shaft. As the input shaft speed increases above "straight through drive," the governor controls the displacement of the same hydraulic unit so that the hydraulic unit connected to the control gear acts as a pump delivering motive fluid to the input shaft connected hydraulic unit whereby the control gear rotates in a direction to subtract speed from the speed of the input shaft.

It is therefore a primary object of the present invention to provide a new and improved hydraulic differential transmission in which the components thereof are designed and located in a transmission housing to conserve space making the transmission particularly useful in a confined or limited envelope. The hydraulic portion of the drive consists of two axial piston units in back-to-back relation against a stationary valve plate thereby to occupy a minimum of space in the housing. Located immediately adjacent and parallel thereto is a sunless differential transmission having elongated sleeve ring gears providing a differential with an over-all length substantially greater than its diameter. By employing these elongated basic components for the transmission, the remaining space in the transmission housing can be advantageously employed for locating the accessory components of the transmission such as a governor, an all-attitude reservoir, scavenge and charge pumps, gearing, and various other filters and valves in the hydraulic circuit.

Another object of the present invention is to provide a generally cylindrical housing for a hydraulic differential transmission having a generally flat separable mounting plate closing one end thereof upon which the basic components of the transmission may be easily stacked during assembly. Both the hydraulic drive and the stick differential are mounted at one end in a mounting plate and may be easily stacked thereon during assembly after which the cylindrical housing member is placed thereover and receives and mounts the other ends of the hydraulic drive and the differential.

A further object of the present invention is to provide a new and improved hydraulic differential transmission with a governor controlling a displacement varying means for one of two hydraulic units which control the speed of rotation of the output shaft both below and above the straight through drive of a gear differential employed in the transmission.

Further objects and advantages will become apparent from the following detailed description taken in connection with the accompanying drawings, in which:

FIG. 3B is a generally schematic drawing of another portion of the hydraulic circuit shown in FIG. 3A;

FIG. 4 is a partially exploded perspective view of the mounting plate and the components adapted to be mounted thereon;

FIG. 5 is an exploded perspective view of the hydraulic differential transmission with the cylindrical housing raised; and FIG. 6 is an exploded view illustrating the gear carrier in the mechanical differential.

Figure 1:
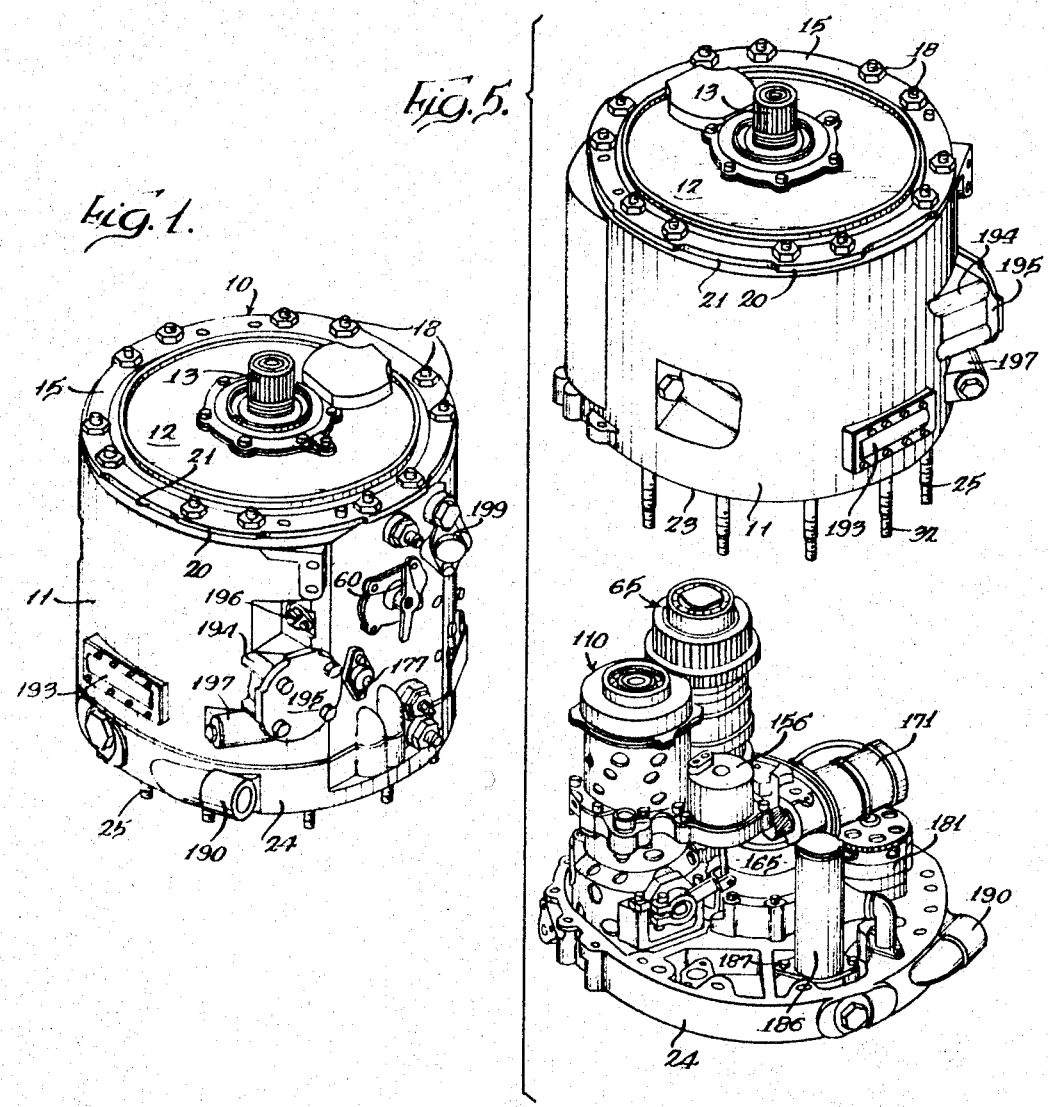
FIG. 1 is a perspective view of the assembled hydraulic differential transmission taken from the input end of the housing.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

It should be understood that many of the features of the present invention are applicable to variable speed drives when it is desired to provide a range of output speeds from a constantly rotating input shaft.

The assembled constant speed transmission generally designated by the numeral 10 is shown in FIG. 1 as it would appear removed from the aircraft engine and alternator. A generally cylindrical housing member 11 has an integral closed end 12 adapted to be mounted adjacent the aircraft engine or gear box pad. A splined input shaft 13 is mounted centrally in the closed end 12 by suitable bearings and extends outwardly from the housing 11 so that it may be inserted into a hollow splined output shaft in the gear box.

Figure 2:
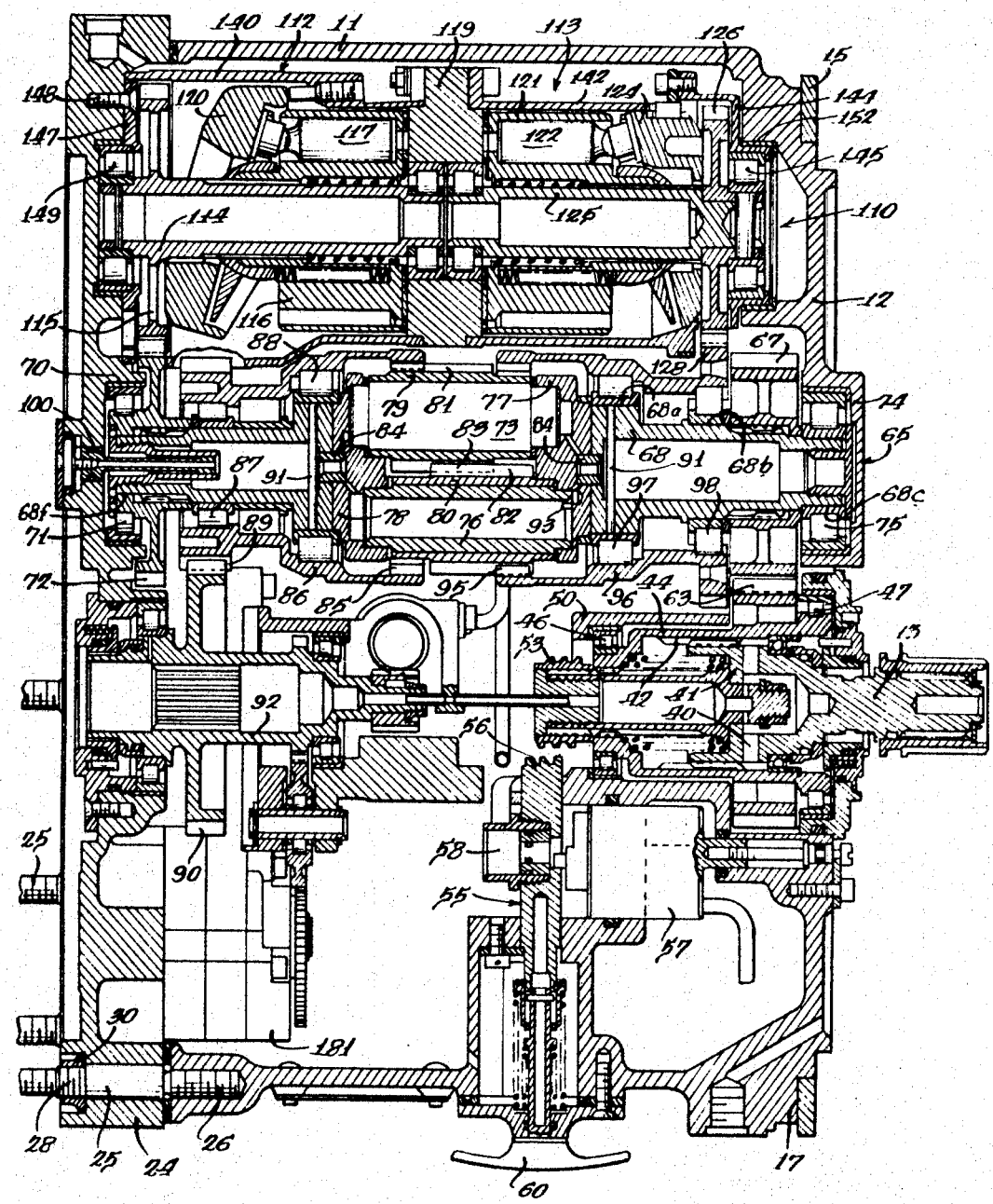
FIG. 2 is an irregular cross-sectional elevation of the assembled hydraulic differential transmission.

For quickly attaching and detaching the hydraulic differential transmission 10 relative to the engine gear box (not shown) an annular adapter ring 15 is provided. As shown in FIGS. 1, 2 and 5, the ring is fastened in an annular shouldered recess 17 on the closed end 12 of the housing member 11 by suitable bolts 18. Formed on the periphery of the ring 15 are alternate tongues 20 and grooves 21. An annular mounting ring (not shown) is provided on the engine gear box pad and has complementary tongues and grooves to those on the adapter ring 15. The differential hydraulic transmission 10 is located on the mounting ring with the input shaft 13 extending into the gear box by aligning the complementary tongues and grooves on the adapter ring 15 and the mounting ring. Then by relative rotation of the mounting ring and adapter ring a few degrees, the transmission is locked against the gear box pad.

As shown in FIGS. 2 and 5, the open end 23 of the housing member 11 is closed by a generally flat mounting plate 24. The mounting plate 24 is secured to the open end 23 of the housing by annularly arranged studs 25 threaded at their ends 26 in the housing member 11, and threaded at an intermediate portion 28 for receiving nuts 30 which fasten the mounting plate 24 to the housing 11. The other threaded ends 32 of the studs 25 extend from the mounting plate and are adapted to receive and attach an alternator or generator housing.

Turning now to the structural arrangement of the transmission components in the housing member 11, and viewing FIG. 2, the input shaft 13 has radial teeth 40 engaging and driving complementary teeth on a splined connector member 41. The connector member engages and drives spline 42 on a gear sleeve 44 mounted by suitable bearings 46 and 47 in an inwardly projection boss 50 formed integrally with the closed end 12 of the housing 11.

The connector 41, threaded sleeeve 53, and a plunger assembly 55 form a quick disconnect device for uncoupling the input shaft 13 from the transmission in the case of an emergency, and form no part of the present invention except for their structural location in the housing 11 and will for this reason not be functionally described in detail. It is sufficient for this purpose to state that a plunger 56 is released either by actuation of a solenoid 57 from the cockpit or by a thermal coupling 58 actuated automatically upon over heating of the transmission, to engage the plunger with the threaded sleeve 53 and disconnect the connector member 41 from the input shaft 13 so that the input shaft will no longer drive the transmission. A reset handle 60 located partially outside of the housing 11 and mounted therein permits the manual resetting of the plunger 56 after actuation by the solenoid 57.

The gear sleeve 44 carries a spur gear 63 which delivers input power to an elongated gear differential generally designated by the numeral 65.

The gear differential 65, along with the hydraulic drive which controls the differential, serves to vary the output speed of the transmission relative to the input speed of shaft 13 to maintain a constant output speed. The power from the input shaft 13 and spur gear 63 to the elongated differential 65 is delivered through a spur gear 67 splined to a differential planet carrier shaft 68, which is the input member to the gear differential 65. The output end of the carrier shaft 68 is mounted in a cylindrical boss 70 in the mounting plate 24 by a suitable roller bearing 71 surrounding one end of a hub of a spur gear 72 splined to the end of the carrier shaft 68. The other end of the carrier shaft is mounted in a projecting boss 74 in the closed end 12 of the housing 11 by a suitable roller bearing 75.

Rotatable in the intermediate portion of the carrier shaft 68 are elongated pinion planets 79 and 80. The pinions 79 and 80 have teeth 81 and 82 interengaging at 83 so that they rotate about their own axes at equal speeds in opposite directions. The gear teeth 81 on pinion 79 engage teeth on an output ring gear 85 formed in an elongated stepped sleeve 86 mounted by bearings 87 and 88 on the carrier shaft 68. The sleeve 86 has a spur gear 89 formed integrally therewith which drives an output gear 90 formed integrally with a hollow internally splined output shaft 92.

Gear teeth 82 on pinion 80 engage a control ring gear 95 formed integrally within a stepped cylindrical control sleeve 96 rotatably mounted by bearings 97 and 98 on the carrier shaft 68. Lubrication is provided for the gear differential 65 by a lubricating tube 100 mounted in the plate 24 and extending into the carrier shaft 68. The tube 100 receives fluid from a hydraulic circuit, described in more detail below, and injects lubricating fluid into the hollow interior of the shaft 68.

Referring particularly to FIGS. 2 and 6, the carrier shaft 68 includes an enlarged hollowed mid portion 66 and reduced opposed end portions, the upper end as shown in FIG. 6, and the right end as shown in FIG. 2, including a portion 68a for receiving bearing 97, a smaller portion 68b for receiving bearing 98 and a still smaller portion 68c for receiving bearing 75. The lower end of the shaft 68 as shown in FIG. 6 and the left end as shown in FIG. 2 includes a portion 68d for receiving bearing 88, a smaller portion 68e for receiving bearing 87 and a still smaller portion 68f on which the gear 72 and bearing 71 are fitted.

In order to rotatably mount the planetary pinions 79 and 80 in the carrier shaft 68, the enlarged mid portion 66 is hollowed diametrically therethrough to provide a cavity 69 adapted to receive an assemblage including both pinions as well as hollow shafts 73 and 76 therefor and bearing blocks or support blocks 77 and 78 for supporting the shafts.

At opposite ends of the hollow pinion shafts 73 and 76, bearing blocks or support blocks 77 and 78 are fitted on reduced end portions of the shafts and the parts thus assembled fit closely into the cavity 79 with the blocks 77 and 78 at opposite ends of the cavity. When thus mounted, as shown in FIG. 2, the bearing blocks 77 and 78 are retained in position by hollow dowel pins 84 disposed coaxially with the shaft, and the pins 84 are in turn retained against dropout by elongate transverse pins 91.

In the specific embodiment illustrated, shafts 73 and 76 are held against rotation in the bearing blocks and the pinions 79 and 80 are rotatable respectively on the shafts. In order to retain the shafts against rotation, each is slotted at one end as illustrated at 92 in order to receive a suitable retention pin as at 93 in at least one of the bearing blocks. It will be understood that specifically different arrangements may be provided, as for example, by rotatably mounting the shafts and rotatably or non-rotatably supporting the pinions on the shafts.

While the shafts 73 and 76 may be substantially identical, and the pinions 79 and 80 may be substantially identical, as shown in FIG. 2, the assemblies, each including a shaft and pinion, are axially offset relative to each other so that adjacent overlapping ends of gear teeth 81 and 83 mesh with each other while opposed outer ends of the teeth are exposed and free to mesh respectively with the ring gear teeth 85 and 95. In order to facilitate assembly and to provide clearance for rotation of the exposed outer ends of the gear teeth 81 and 82, each of the bearing blocks 77 and 78 may be suitably recessed in the vicinity of the adjacent gear end as, for example, at 77a and 78a.

During assembly of the transmission, the entire gear differential 65 assembled together as shown in FIG. 4 is easily mounted in the housing as a unitary subassembly by inserting it or stacking it in the boss 70 of the mounting plate 24. After the other components have been mounted on the plate 24, the cover or housing member 11 is fastened thereover with the outwardly projecting boss 74 supporting the other end of the gear differential 65.

The speed ratio between each of the ring gears 85 and 95 and the carrier shaft 68 is 2 to 1. That is, if the output ring gear 85 is held stationary and the input shaft 13 rotated, the control ring gear 95 will rotate at twice the speed of the carrier shaft 68. And conversely, if the control ring gear 95 is held stationary, the output ring gear 85 will rotate at twice the speed of the carrier shaft 68. Since a constant output speed of gear 89 and output shaft 92 is desired, the ring gear 95 is constrained in a manner more fully described below by a hydraulic drive to produce a controlled output speed. It may readily be seen that if the ring gear 95 rotates in an opposite direction to the carrier shaft 68, this will increase the speed of rotation of the pinions 79 and 80 about their own axes and thereby increase the speed of rotation of the output ring gear 85 above the 2 to 1 ratio which would exist if the ring gear 95 were held stationary. On the other hand, if the control ring gear 95 is rotated in the same direction as the carrier shaft 68, the pinions 79 and 80 will rotate at a slower speed than if the ring gear 95 were stationary and thereby produce an output ring gear 85 speed less than twice that of the carrier shaft 68. When the control ring gear 95 is held stationary, the differential is in a so-called straight-through drive condition. In the above manner the control gear 95 serves to add or subtract speed from the differential.

For the purpose of controlling the speed and direction of rotation of the control ring gear 95, a hydraulic drive generally designated by the numeral 110 is provided as shown in FIGS. 2, 3B, 4 and 5. Referring to FIG. 2, the hydraulic drive 110 consists of two back-to-back axial piston hydraulic units 112 and 113 mounted in the housing parallel to the gear differential 65 and closely adjacent thereto with their common axis lying in a different radial plane than the differential 65, as shown in FIGS. 4 and 5. Each of the hydraulic units may act either as a pump or a motor depending upon the displacement control described in more detail below. The hydraulic unit 112 is of the variable displacement type and has a shaft 114 with a gear 115 formed integrally thereon which engages spur gear 72 which as noted above rotates with the input shaft 13. The shaft 114 is splined to and drives or is driven by a rotating cylinder block 116 carrying reciprocable axial pistons 117. An adjustable swashplate or cam member 120 reciprocates the pistons 117 in the cylinder block to deliver hydraulic fluid from the variable hydraulic unit 112 when it is acting as a pump. The cylinder block 116 slidably engages a valve plate 119 having two arcuate ports therethrough adapted to connect the units 112 and 113 in closed hydraulic circuit.

The fixed displacement hydraulic unit 113 consists of a rotating cylinder block 121 having reciprocable pistons 122 therein driven by a stationary swashplate member 124. Similarly to block 116, block 121 slidably engages the valve plate 119 and the pistons therein deliver and receive fluid through the arcuate ports in the valve plate 119. A drive shaft 125 is splined to and rotates with the cylinder block 121 and carries a spur gear 126 on the outboard end thereof which engages a spur gear 128 on the control ring gear sleeve 96. The inner adjacent ends of shafts 114 and 125 are supported in bearings in the valve plate 119.

With the swashplate in the position shown in FIG. 2 and with gear 115 rotating in a clockwise direction when viewed from the input shaft side of the transmission, the variable hydraulic unit 112 will act as a pump being driven from the input shaft 13 delivering high pressure fluid through the valve plate 119 and forcing the pistons 122 down the inclined surface of the fixed cam member 124 of the fixed hydraulic unit 113 thereby rotating shaft 125 and the control gear 95 in a direction to add speed to the differential 65. Conversely, when the swashplate 120 is reversed from the position shown in FIG. 2, the hydraulic unit 113 acts as a pump being driven by the control ring gear 95, which then rotates in an opposite direction as it is driven by the pinion 80, to deliver high pressure fluid to the variable hydraulic unit 112 which then acts as a motor or a metering unit retarding the free flow of high pressure fluid from the hydraulic unit 113 thereby constraining rotation of the ring gear 95 which is then rotating in a direction to subtract speed from the differential output.

A can-like housing or cage for the hydraulic drive 110 is provided to facilitate assembly and conserve space in a limited envelope for the hydraulic transmission. The can housing consists of two cylindrical housing members 140 and 142 surrounding the hydraulic units 112 and 113, respectively, and having circular openings 141 therein, as shown more clearly in FIG. 4, to permit drainage of leakage fluid from the hydraulic units to the sump. A cover member 144 encloses the input end of the hydraulic drive unit and houses a bearing 145 which supports the fixed unit output shaft 125. The outboard end of housing member 140 fits snugly around a perforated circular pilot plate 147 secured to the mounting plate 24 by machine screws 148. The pilot plate 147 also receives the outer race of a bearing 149 which supports one end of the input shaft 114 in the variable displacement hydraulic unit 112.

During assembly of the hydraulic drive 110, the hydraulic units 112 and 113 are placed in back-to-back relation against the valve member 119 and together with the housing members 140 and 142 fastened to the valve member 119, and the cover 144, form a separate subassembly. This assembly is stacked on the mounting plate 24 by first securing the pilot plate 147 as shown in FIG. 4 to the plate 24 and then fitting the outboard end of housing member 140 on the periphery of plate 147 and inserting the outboard end of shaft 114 into the inner race of the bearing 149. After the other components have been assembled, the cover 12 is placed thereover and fastened to the mounting plate 24 with cylindrical boss 152 in the end 12 receiving and supporting a portion of the cover member 144 so that the entire hydraulic drive assemb'y is supported at both ends in the housing 11 and the mounting plate 24.

As noted above, the hydraulic unit 112 is of the variable displacement type and as shown more clearly in FIG. 4, a control cylinder generally designated by the numeral 156 is provided to vary the position of the swashplate 120 on both sides of the neutral position in which the swashplate is perpendicular to the axis of rotation of the cylinder block 116. Formed integrally with the valve plate 119 is a cylindrical yoke 157 which receives and mounts the control cylinder 156. The cam member 120 has radially extending trunnions 159 mounted by suitable brackets 160 in the housing member 140 so that the cam member 120 may rotate to maximum displacement positions on either side of neutral. An arm assembly 161 in FIG. 4 connects a piston in the control cylinder 156 to one of the trunnions 159 to vary the swashplate angle in accordance with the dictates of a hydraulic governor valve as described in more detail below. In considering just the structural arrangement of components, the control cylinder 156 is assembled as a part of the subassembly drive unit 110 prior to stacking the subassembly on the pilot plate 147.

Cam or swash plate 124 is supported in cage 142.

In addition to the gear differential 65 and the hydraulic drive 110, other components of the transmission are mounted on the plate 24 for ease of assembly and conservation of space in the relatively small envelope. Referring to FIGS. 4 and 5, a generally arcuate output shaft housing member 165 has bosses 166 therein which receive bolts for fastening the housing 165 in the mounting plate 24 around a central boss 168 thereon. Formed integrally with the housing member 165 is a bracket 170 having an aperture which receives and supports one end of a governor assembly 171. The governor is driven by a helical gear 172 splined to and driven by the output shaft 92 and a meshing helical gear 173 splined to a rotating shaft in the governor. The governor is shown in detail in FIG. 3C and will be described functionally hereinafter. The governor 171, when mounted in place as shown in FIG. 5, lies substantially parallel to the mounting plate 24 and has its end 175 located adjacent a governor adjusting cover 177 as shown in FIG. 1, which when removed permits adjustment of the governor 171. Suitable conduits connect the governor 171 to the control cylinder 156 to deliver hydraulic control fluid to the same.

A scavenge pump 180 is provided for pumping leakage and drain fluid from the interior of the housing 11 and is fastened to the mounting plate 24 as is a charge pump 181 which serves to deliver control fluid, lubricating fluid, and makeup fluid to the transmission as described more fully below. Both scavenge pump 180 and charge pump 181 are driven through suitable gearing by the output shaft 92 and spur gear 183 fixed thereto, as shown in FIG. 4. A swirl chamber 186 is mounted by bolts 187 on the mounting plate 24 and serves to deaerate the hydraulic fluid returning to the charge pump 181.

Viewing FIG. 5, it should be understood that an integral reversoir is carried within the housing 11 and fits around the swirl chamber 186 to provide therewith an all-attitude reservoir for the transmission. An oil inlet boss 190 is formed integrally on the periphery of the mounting plate 24 and has a suitable passage communicating with the swirl chamber 186.

Other details of the housing 11 shown in FIG. 1 form no part of the present invention and will be described only briefly. A sight glass 193 permits the visual inspection of the oil level within the housing. A protruding boss 195 receives one end of a hydraulic oil filter in the housing (described hereinafter) and permits removal thereof through a cover 195. An electrical connector 196 permits supply of electrical power to the disconnect solenoid 57. A boss 197 seats a generator by-pass valve which permits hydraulic fluid to by-pass certain generator cooling passages described in more detail below. A charge relief valve boss 199 seats a valve which maintains charge pressure in the hydraulic oil circuit. Other fittings shown in FIG. 1 are primarily drain and inlet oil passages.

Figure 3A:
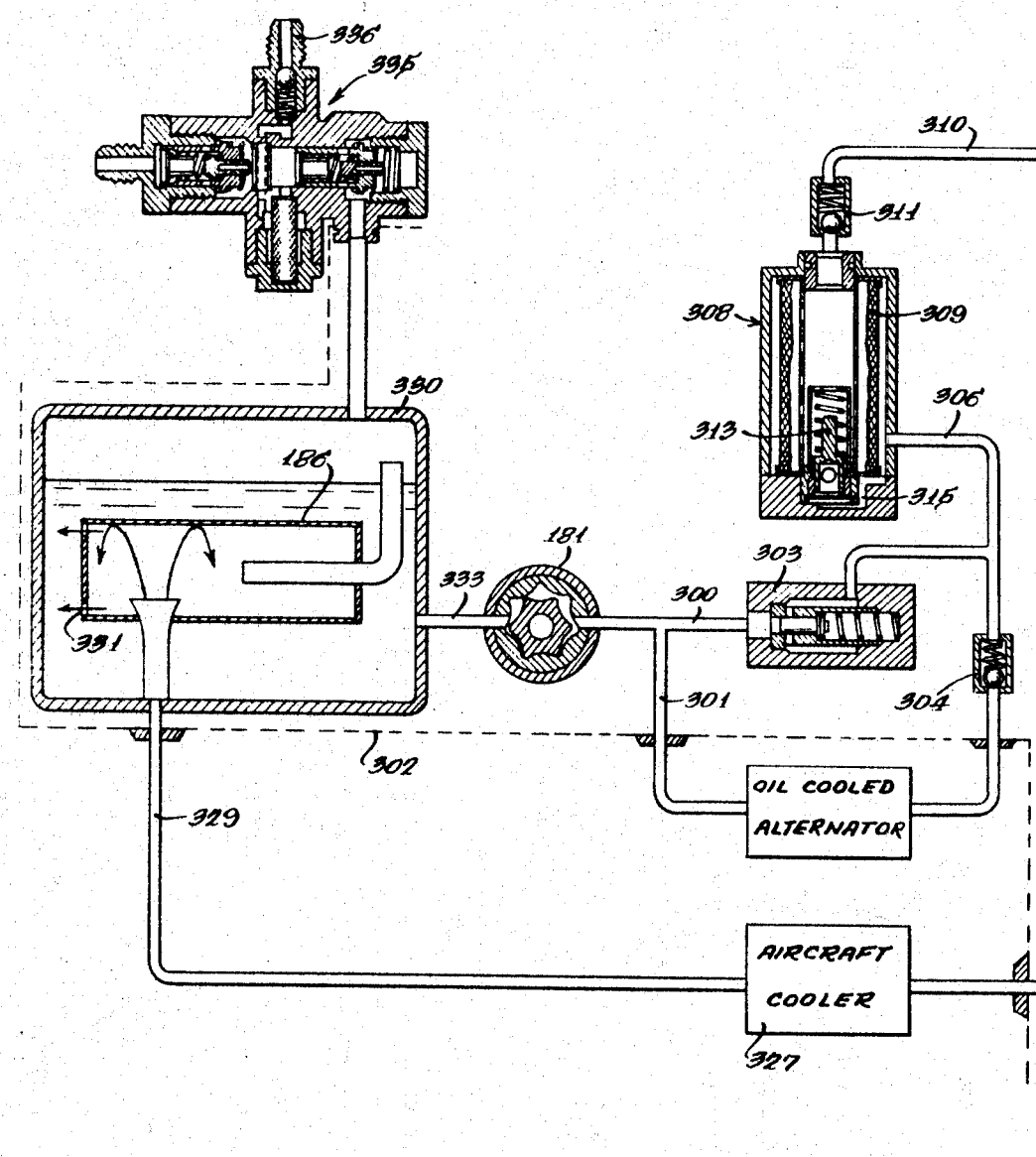
FIG. 3A is a schematic drawing of one portion of the hydraulic circuit in the differential hydraulic transmission.
Figure 3C:
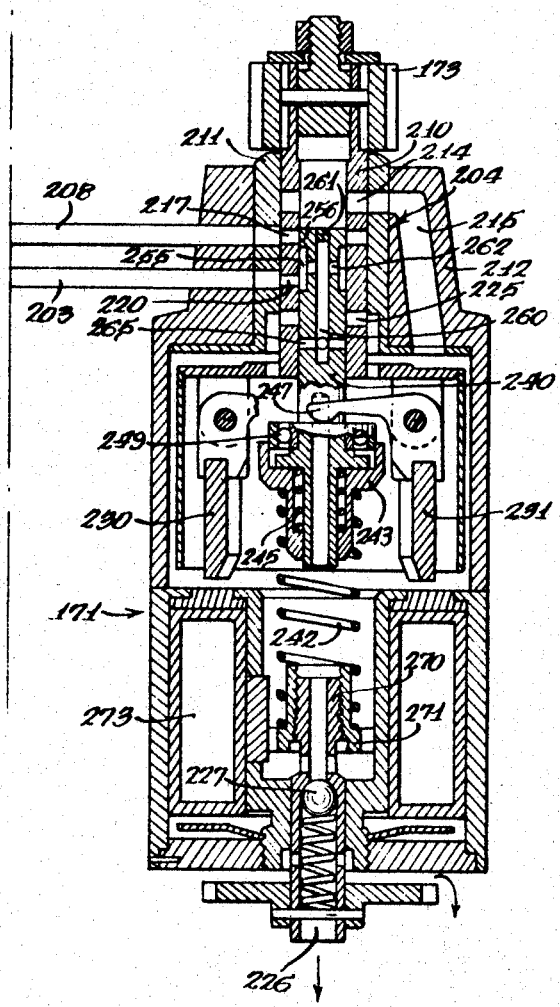
FIG. 3C is a cross section of the control governor and conduits forming another part of the hydraulic circuit shown in FIGS. 3A and 3B.

Referring to FIGS. 3A, 3B and 3C now, where the functional relationship of the components and the hydraulic circuitry therefor will be described in detail, as noted above, the hydraulic governor 171 controls the displacement control cylinder 156 to add speed in the differential for input speeds less than the straight-through drive speed, and in this mode the hydraulic unit 112 acts as a pump. Conversely, for input speeds above straight-through, the governor 171 controls the control cylinder 156 to reverse the swashplate 120 whereby the hydraulic unit 112 acts as a motor and the ring gear 95 reverses rotation causing the differential to subtract speed to maintain a constant output speed throughout a range of input speeds. As an exemplification of the relative speeds, this transmission is designed to accommodate input speeds varying from about 3,700 r.p.m. to 7,400 r.p.m. and throughout this speed range the transmission will maintain a constant output shaft 92 rotation of 8,000 r.p.m. The governor 171 is designed to place the differential in the straight-through drive position at an input speed of about 5,000 r.p.m. at shaft 13, so that, assuming that the aircraft normally cruises with an input shaft rotation of about 6,000 r.p.m., the hydraulic differential transmission normally operates well above the straight-through drive speed. The relationship of input shaft 13 to carrier shaft 68 is such that when shaft 13 rotates at 5,000 r.p.m., carrier shaft 68 rotates at 5,250 r.p.m., for example. When ring gear 85 rotates at 10,500 r.p.m. output shaft 92 rotates at 8,000 r.p.m., for example.

Now turning to the governor control circuit in more detail, control pressure is maintained by the hydraulic circuit in conduit 200 connected both to the control cylinder 156 through passage 202 and to the governor 171 through passage 203 which is the supply passage for a hydraulic governor valve generally indicated by the numeral 204. The control cylinder 156 includes a piston 206 slidable in the cylinder 156 and biased to the right end thereof by a spring 207. The spring 207 and fluid pressure from passage 202 acting against the left surface of the piston 206 urge the piston to the right and fluid pressure on the right end of the piston 206 from the governor valve 204 urges the piston to the left. The governor valve 204 serves to connect the right end of the piston 206 through passage 208 either to drain or to control pressure from passage 203. When passage 208 is pressurized by the control fluid, the piston 206 will move to the left because of the differential area and corresponding differential forces on the ends of the piston. It should be understood that the piston 206 and linkage 161 are designed to rotate the swashplate clockwise from the position shown in FIG. 3B to a neutral position, and further clockwise to a negative position where the hydraulic unit 112 acts as a motor rather than a pump.

Viewing FIG. 3C, the governor 171 is driven through the helical gear 173 by the output shaft 92. Fixed to the gear 173 is a rotary sleeve valve member 210 rotatable in a stationary valve member 211 mounted in a casing 212. The rotary valve member 210 has drain ports 214 at the upper end thereof communicating with the interior of the valve member 210 and with a drain passage 215 in the casing 212. Also formed in the valve member 210 are ports 217 which serially communicate with conduit 208 connected to the control cylinder 156. Spaced below the ports 217 are supply ports 220 which serially communicate with fluid under control pressure from passage 203. Further drain ports 225 are provided in the lower end of the rotating valve member 210 which communicate with the interior of the governor casing 212 which form a drain with drain passage 226 therein normally closed by a check valve 227.

The governor 171 is provided with speed sensitive flyweights 230 and 231 which are pivotally mounted on flanges fixed to the lower end of rotary valve sleeve 210 so that the flyweights rotate with the valve. A reciprocating plunger valve 240 is axially slidable in the rotary valve 210 and normally biased to its uppermost position by a spring 242 acting on flange 243 and a spring 245 mounted within the flange 243 and acting upon a flange on the lower end of the plunger valve 240. Radial projections 247 on the flyweights act on a bearing 249 axially fixed on the plunger valve 240, to move the plunger 240 downwardly (in FIG. 3C) against the force of the springs 245 and 242. In FIG. 3C, the spring 245 is compressed so that flange 243 abuts the plunger valve 240. However, when the flyweights are completely relaxed, i.e., not rotating, the flange 243 moves away from the valve 240 under the force of spring 245 which is weak relative to spring 242.

The upper free end of plunger valve 240 has an annular recess 255 thereon defining an upper land 256. The land 256 is approximately the same width as the ports 217. The recess 255 and land 256 selectively connect the conduit 208 to conduit 203 or to drain thereby providing motive fluid to the control cylinder 156 or exhausting the control cylinder. Further, the plunger 240 has a central passage 260 closed at its upper end with a plug 261, and radial passages 262 extending therefrom communicating with recess 255 and another radial passage 265 selectively communicable with drain ports 225.

The setting of the governor may be varied by rotating the threaded sleeve 270 with respect to a spring seat flange 271 to adjust the force of the spring against the flyweights 230 and 231.

An electromagnet 273 is provided adjacent the flyweights to permit synchronization of the transmission with other constant speed drives employed in the same aircraft and connected in parallel, but forms no part of the present invention and will not be described in detail.

Operation

In operation, when the speed of the output shaft 92, driving the governor, is at the desired constant r.p.m., the governor valve stem 240 attains a null position approximately as shown in FIG. 3C, wherein the cylinder conduit 208 is closed off from the pressure conduit 203 and the drain port 214, in order to hold the displacement varying means stationary, and the stem retains such steady state position so long as the speed of the output shaft remains constant. If the speed of the output shaft is below, or falls below, the desired constant output r.p.m., due to low input speed or increased load, the governor valve stem 240 rises (in FIG. 3) to admit control fluid under pressure to the conduit 208, so that the displacement varying means reacts to increase the output speed. If the speed of the output shaft rises above the desired constant output r.p.m., the governor valve stem 240 moves downward to communicate the conduit 208 with drain so that the displacement varying means reacts to reduce output speed.

Thus, when the aircraft engine is started initially, the flyweights 230 and 231 are closer together than shown in FIG. 3C and the recess 255 communicates conduit 208 with conduit 203 so that the control fluid pressure applied to the right end of piston 206 moves the piston to the left and rotates the swashplate 120 to its maximum pumping position shown. Under these conditions the hydraulic unit 112 supplies motive fluid to the hydraulic unit 113 which then acts as a motor rotating the ring gear 95 in a direction opposite that of the carrier shaft 68 to add speed in the differential. Below the straight-through drive condition, the control gear 95 adds enough speed so that the output shaft 92 rotates at 8,000 r.p.m. Once the desired output speed is attained, if the input speed increases, the output speed will tend to increase and the flyweights 230 and 231 will move slightly downward from the position shown in FIG. 3B, to a position where recess 255 will not communicate with ports 217 and fluid from passage 208 is permitted to flow across the top of the land 256 through drain ports 214 and 215 into the interior of the casing, thereby permitting the piston 206 to begin movement to the right to decrease the displacement of the variable hydraulic unit 112, reducing the speed added to the gear differential 65 by reducing the speed of the ring gear 95.

At about a 5,000 r.p.m. input speed, the governor places the swashplate 120 in a nearly vertical position. In this position the hydraulic unit 113 tends to act as a pump to deliver fluid to the hydraulic unit 112, but because the hydraulic unit 112 is at zero displacement, or nearly so, it is not capable of transferring any motive fluid and for this reason brakes the hydraulic unit 113 against rotation which prevents the ring gear 95 from rotating. This is the straight-through drive position and power is transferred from the input shaft 13 to the output shaft 92 in a 5 to 8 ratio directly through the gear differential 65 without any power transfer through the hydraulic drive 110.

As the speed of the input shaft 13 increases above the straight-through drive speed, output speed tends to increase and the flyweights move the plunger 240 down and port fluid from conduit 208 and the right end of cylinder 156 to the drain passage 215, and the swashplate 120 begins moving and increasing the displacement of hydraulic unit 112 in the negative direction. The hydraulic unit 113 begins acting as a pump driven by the control ring gear 95. In this mode the control gear 95 rotates in a direction opposite to the add speed mode, because it is now driven by the carrier shaft 68 through the pinion 80, and will rotate in the same direction as the carrier shaft 68. The speed of pinions 79 and 80 is reduced compared with the straight-through drive speed and the output speed is maintained at 8,000 r.p.m.

Referring now to FIGS. 3A, 3B and 3C for a description of the hydraulic circuit in the transmission, the charge pump 181 delivers makeup, lubricating and control fluid for the system through conduits 300 and 301. The dotted line 302 in FIG. 3A schematically indicates the transmission housing 11 whereby it is seen that some of the hydraulic lines pass from the housing 11. Charge and control fluid from the charge pump 181 is delivered to a generator bypass valve 103 and outside the transmission housing through branch conduit 301 to the alternator for cooling the same. As the pressure drop across the alternator rises above a predetermined level, the by-pass valve 303 permits charge fluid to pass directly to the system without passing through the alternator as the alternator then receives a sufficient flow of cooling oil. A check valve 304 prevents drip from the alternator upon removal of the filter.

Fluid from the by-pass valve 303 and the alternator is admitted through conduit 306 to the filter 308 where fluid passes through a filter element 309 and into a conduit 310 through check valve 311. If the filter element 309 becomes excessively clogged, unduly restricting flow therethrough, a filter by-pass valve 313 permits fluid flowing from conduit 306 to by-pass the filter element 309 through passage 315. Viewing FIG. 5 for a moment, the filter 308 is adapted to be fixed parallel to the governor 175 and adjacent thereto and extending into the boss 194 in the housing 11 and the cover plate 195 permits access to the filter element through the housing 11. The charge or makeup fluid in conduit 310 is fed to the low pressure passage or port in the valve plate 119 where a portion of this fluid enters the closed hydraulic circuit between the hydraulic units 112 and 113 to make up for the loss of fluid caused by leakage from these units. Charge pressure is delivered through conduit 200 to the control cylinder 156 and the governor valve 204, through passages 202 and 203, respectively. Excess fluid flows over a charge relief valve 315.

The purpose of the charge relief valve 315 is to maintain a preset charge pressure in conduit 200. This preset pressure may be on the order of 300 pounds per square inch. Viewing FIG. 3B, the charge relief valve 315 consists of a spool 316 slidably mounted in a stationary valve member 317 having a discharge port 318 therein communicating with the return conduit 319. The spool valve 316 is biased to the right by springs 320 against the end 321 of the stationary valve member 317. The force of the springs 320 is selective so that when just over 300 p.s.i. pressure is exerted on the right end of the spool 316, the spool will move to the left opening port 318 to the conduit 200 and permitting charge oil to flow in the return conduit 319. The discharge passage 323 permits leakage oil to be drained into the casing or housing member 11 of the transmission.

The scavenge pump 180 picks up lubricating oil and internal leakage oil and pumps it in to the return conduit 319 through conduit 326. It should be noted that the scavenge pump 180 is actually in parallel with the charge relief valve so that a continuous flow of oil is assured in the return conduit 319. By so arranging the scavenge pump and the charge relief valve, the scavenge pump need only to scavenge the leakage and lubrication oil from the transmission housing and full use is made of the contained oil supply being pumped through the transmission in closed circuit fashion by the charge pump to assure that the oil always flows through the transmission outlet to the aircraft cooler and back to the charge pump 181. This is particularly advantageous in the aircraft environment as it is difficult to predict just where the oil normally contained in the transmission sump would be located. The scavenge fluid and returning charge fluid are passed through conduit 319 outside of the transmission housing to the aircraft cooler 327 where the temperature of the oil is reduced before re-entry into the transmission housing through conduit 329. The cooled hydraulic fluid passes through the integral all attitude reservoir 330 and into the swirl chamber 186 where the entrained air is separated from the fluid and air free fluid passes from the chamber through the peripheral ports 331 therein. As the details of the all attitude reservoir 330 form no part of the present invention, it is merely shown in schematic form in FIG. 3A, but suffice it to state that the reservoir 330 will supply a continuous flow of fluid to the charge pump 180 through conduit 333 regardless of the attitude of the reservoir.

An air regulator 335 is supplied with air through fitting 336 from a separate source and maintains a compatible air pressure in the reservoir 330 and the housing. The regulator 335 is mounted on the periphery of the mounting plate 24 outside of the transmission housing.

Lubricating oil flows to the hydraulic drive 110 and the gear differential 65 from conduits 338 and 339 which receive lubricating fluid from the charge pressure conduit 200.

I claim:

1. In a differential hydraulic transmission adapted for use in a confined space, an input shaft adapted to be drivingly connected to a source of power; an output shaft adapted to be drivingly connected to a device to be driven at controlled speed; a mechanical differential including an elongate gear carrier rotatable about a predetermined axis, a pair of meshing pinions rotatable on the carrier about axes parallel to the carrier axis, and a pair of coaxial internal ring gears rotatably mounted concentric about the carrier axis and respectively in mesh with the pinions; gearing drivingly connecting the input shaft to the carrier to rotate the latter; gearing drivingly connecting one ring gear to the output shaft to rotate the latter; a hydraulic drive parallel to the differential including a pair of coaxial rotary axial piston fluid translating devices on an axis parallel to the carrier axis; and conduit means connecting the two devices in closed hydraulic circuit; gearing drivingly connecting the carrier to one device; gearing drivingly connecting the other device to the other ring gear; means for varying the displacement of one device; and means for controlling the displacement varying means to control the speed of the output shaft relative to the speed of the input shaft.

2. In a differential hydraulic transmission adapted for use in a confined space, an input shaft adapted to be drivingly connected to a source of power; a coaxial output shaft adapted to be drivingly connected to a device to be driven at a controlled speed; an elongate relatively slim mechanical differential including an elongate gear carrier rotatable about an axis parallel to the axis of the input and output shafts, a pair of elongate relatively slim pinions rotatable on the carrier about axes parallel to the carrier axis and having adjacent ends in mesh with each other, and a pair of elongate coaxial sleeves concentrically encasing the carrier and each having an internal ring gear, said ring gears respectively in mesh with opposite ends of said pinions; gearing drivingly connecting the input shaft to the carrier at one end of the latter to rotate the latter; an elongate relatively slim hydraulic drive closely adjacent to and parallel with the differential including a pair of coaxial rotary axial piston fluid translating devices on an axis parallel to the carrier axis, and conduit means connecting the two devices in closed hydraulic circuit so that one delivers fluid under pressure to drive the other and the latter returns fluid to the former; gearing drivingly connecting the carrier adjacent its opposite end to one of said devices; gearing drivingly connecting the other of said devices to one of said sleeves adjacent said one end of said carrier; gearing adjacent said opposite end of the carrier drivingly connecting said other sleeve to the output shaft to rotate the latter; means for varying the displacement of one of said devices; and means for controlling the displacement varying means to control the speed of the output shaft relative to the speed of the input shaft.

3. A combination as defined in claim 2 wherein the displacement varying means is associated with the fluid translating device connected by gearing to the carrier.

4. A combination as defined in claim 2 wherein said fluid translating devices each comprises a rotary cylinder block and a nonrotary swashplate.

5. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an input gear, an output gear and a control gear, at least one of said gears having an elongated sleeve extending therefrom, the axes of said gears being parallel; a hydraulic drive mounted in said housing closely adjacent and parallel to said differential, said hydraulic drive including two axial piston hydraulic units in back-to-back relation and connected to deliver motive fluid therebetween whereby one unit drives the other, means for varying the displacement of one of said units, first gear means at the end of one of said units drivingly connected thereto, second gear means at the end of the other of said units drivingly connected thereto, said sleeve extending adjacent said first gear means and having gear means thereon drivingly connected to said first gear means, said second gear means being drivingly connected to another of said differential gears, and means for controlling the displacement varying means so control the speed of the output shaft, said differential including an elongated planet carrier having intermeshing pinions thereon, an elongated sleeve having a ring gear formed therein meshing with the other of said pinions, said planet carrier being driven by said input shaft, one of said ring gear sleeves being connected to drive said output shaft, and the other of said ring gear sleeves being drivingly connected to one of said hydraulic units.

6. A hydraulic differential transmission for use in a limited space generally cylindrical housing member having a closed end and an open end, comprising: an input shaft mounted in said housing and extending through said closed end where it is adapted to be drivingly connected to a source of power, a generally flat mounting plate connected to and closing the open end of said housing member, an output shaft mounted for rotation in said mounting plate and adapted to be drivingly connected to a device to be driven at a controlled speed; a mechanical differential including an elongated gear carrier shaft, one end of said carrier shaft being mounted in said closed end adjacent said input shaft and the other end of said carrier shaft being mounted in said mounting plate, gear means on said input shaft for driving said carrier shaft, a pair of meshing pinions rotatable on said carrier shaft, and a pair of coaxial ring gears mounted concentrically with said carrier shaft each engaging one of said pinions; gearing drivingly connecting one of said ring gears to drive said output shaft; a hydraulic drive parallel to said differential including a pair of axial piston fluid energy translating units, a stationary valve plate having ports therein for delivering motive fluid between said units to transfer power therebetween, said units being mounted in back-to-back relation against said valve plate, the end of one of said units opposite said valve plate being mounted in said mounting plate whereby the hydraulic drive may be stacked along with the differential on the mounting plate during assembly, the end of the other of said units opposite said valve plate being mounted in the closed end of said housing member, gearing drivingly connecting the end of the carrier shaft adjacent the mounting plate to the unit mounted on said plate, gearing drivingly connecting the other ring gear to the unit mounted in said closed end, and means for varying the displacement of one of said units to control the speed of the output shaft relative to the speed of the input shaft.

7. In a constant speed drive transmission, a generally circular end mounting plate; a generally cylindrical housing member closed at one end and open at one end; the latter adapted to fit said mounting plate to provide a closed generally cylindrical housing; an input shaft rotatably mounted in the closed end of said housing and having a drive gear thereon; an output shaft rotatably mounted in said plate and having a driven gear thereon; a differential gearing drivingly connecting the input shaft and the output shaft including an elongate gear carrier having opposite ends respectively adjacent said mounting plate and the closed end of said housing member, a pair of pinions rotatable on said carrier in mesh with each other, bearing means on opposite ends of the gear carrier respectively receivable in said mounting plate and housing member closed end, a pair of coaxial sleeves concentric and rotatable on said gear carrier, each having an internal ring gear engaging one of said gear carrier pinions, an input gear on one end of the carrier engageable with said drive gear, an output gear on one sleeve engageable with said driven gear, a control gear on the other sleeve adjacent said input gear, and a transmission gear on the end of said gear carrier adjacent said output gear; a hydraulic transmission including a pair of coaxial fluid translating devices each comprising a rotatable cylinder block with axially reciprocable pistons therein and a swashplate cooperating with the pistons, a center valve plate against which both cylinder blocks are rotatably seated, a generally cylindrical cage around each cylinder block, each carrying one of said swashplates, means securing said cages to said center valve plate, a pair of coaxial shafts associated respectively with said fluid translating devices, each extending through the associated swashplate and cylinder block and drivingly connected for rotation with the associated cylinder block, bearing means mounting adjacent ends of the shafts in said center valve plate, bearing means in said mounting plate for rotatably supporting the outboard end of one shaft, bearing means in one of said cages for supporting the outboard end of the other shaft, a gear on said one shaft meshing with said transmission gear, a gear on said other shaft meshing with said control gear, and means for mounting the other cage on said plate; and means for securing said cylinder housing member to said mounting plate; the arrangement being such that in assembly the entire structure recited except the input shaft may be stacked upon the mounting plate after which the housing member is attached.

8. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an elongated gear carrier means, a pair of meshing pinion members rotatable on said carrier, and a pair of coaxial internal ring gear members rotatably mounted concentrically about the carrier axis and in mesh with said pinions, gearing connecting the input shaft to rotate one of said members, the axes of said gear members being parallel; a hydraulic drive mounted in said housing closely adjacent and parallel to said differential, said hydraulic drive including two axial piston hydraulic units in back-to-back relation and connected to deliver motive fluid therebetween whereby one unit drives the other, said elongated gear carrier member having a length approximately the same as the hydraulic units, means for varying the displacement of one of said units, first gear means at the end of one of said units drivingly connected thereto, second gear means at the end of the other of said units drivingly connected thereto, sleeves extending axially from each of said ring gear members to positions adjacent the ends of the hydraulic units, gear means on the end of one of said sleeves drivingly connected to said first gear means, gear means on the end of the other of said sleeves, said second gear means being drivingly connected to one of said members and means for controlling the displacement varying means to control the speed of the output shaft.

9. A hydraulic differential drive as defined in claim 8, wherein said hydraulic drive includes a valve plate between said back-to-back hydraulic units and having ports therein for delivering fluid between said units, said valve plate having a yoke formed on one side thereof, said displacement varying means including a control cylinder mounted parallel to said hydraulic drive in said yoke and having an arm extending from said cylinder connected to said one hydraulic unit to vary the displacement thereof.

10. A hydraulic differential drive as defined in claim 8, wherein said housing means includes a substantially flat mounting plate at one end thereof, said plate being perpendicular to the axis of said hydraulic drive and said differential and having a mounting surface facing the interior of said housing, and means on said surface for receiving and supporting one end of said hydraulic drive and said differential whereby the hydraulic drive and the differential may be stacked on the mounting plate during assembly.

11. A hydraulic differential drive as defined in claim 8, wherein the latter sleeve extends adjacent but spaced from said second gear means, and said gear means on the end of said second sleeve being drivingly connected to one of said shafts.

12. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an input gear, an output gear and a control gear; a hydraulic drive mounted in said housing closely adjacent and parallel to said differential, said hydraulic drive including two axial piston hydraulic units in back-to-back relation and connected to deliver motive fluid therebetween whereby one unit drives the other, means for varying the displacement of one of said units, gearing connecting one of said units to said control gear, gearing connecting the other of said units to one of said shafts, means for controlling the displacement varying means to control the speed of the output shaft, said housing means including a substantially flat mounting plate at one end thereof, said plate being perpendicular to the axis of said hydraulic drive and said differential and having a mounting surface facing the interior of said housing, and means on said surface for receiving and supporting one end of said hydraulic drive and said differential whereby the hydraulic drive and the differential may be stacked on the mounting plate during assembly, said housing including a generally cylindrical cover having one closed end and an open end adapted to be connected to said mounting plate, said closed end having a mounting surface facing the interior of the housing, said surface having means for supporting the other ends of said hydraulic drive and said differential.

13. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an input gear, an output gear and a control gear; a hydraulic drive mounted in said housing closely adjacent and parallel to said differential, said hydraulic drive including two axial piston hydraulic units in back-to-back relation and connected to deliver motive fluid therebetween whereby one unit drives the other, means for varying the displacement of one of said units, gearing connecting one of said units to said control gear, gearing connecting the other of said units to one of said shafts, means for controlling the displacement varying means to control the speed of the output shaft, said housing means including a substantially flat mounting plate at one end thereof, said plate being perpendicular to the axis of said hydraulic drive and said differential and having a mounting surface facing the interior of said housing, and means on said surface for receiving and supporting one end of said hydraulic drive and said differential whereby the hydraulic drive and the differential may be stacked on the mounting plate during assembly, said hydraulic drive including a valve plate between said back-to-back hydraulic units and having ports therein for directing motive fluid therebetween, cylindrical housing members surrounding each of said hydraulic units connected to said valve plate, one of said cylindrical housing members having an open end, and a circular pilot plate having a central opening therein fastened to said mounting plate surface, said pilot plate having a diameter substantially equal to said open end of said cylindrical housing whereby the cylindrical housing may be stacked on the pilot plate during assembly.

14. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an input gear, an output gear and a control gear; a hydraulic drive mounted in said housing closely adjacent and parallel to said differential, said hydraulic drive including two axial piston hydraulic units in back-to-back relation and connected to deliver motive fluid therebetween whereby one unit drives the other, means for varying the displacement of one of said units, gearing connecting one of said units to said control gear, gearing connecting the other of said units to one of said shafts, means for controlling the displacement varying means to control the speed of the output shaft, said housing means including a substantially flat mounting plate at one end thereof, said plate being perpendicular to the axis of said hydraulic drive and said differential and having a mounting surface facing the interior of said housing, and means on said surface for receiving and supporting one end of said hydraulic drive and said differential whereby the hydraulic drive and the differential may be stacked on the mounting plate during assembly, a charge pump adapted to deliver fluid to the inlet of one of said hydraulic units and connected to deliver control fluid to said displacement varying means, and a scavenge pump for withdrawing leakage fluid from said housing interior connected to deliver fluid to said charge pump, both of said pumps being mounted on said mounting plate to facilitate assembly and conserve space in said confined envelope.

15. A hydraulic differential drive for use in a limited envelope, comprising: a housing, an input shaft mounted in said housing and adapted to be connected to a source of power, an output shaft mounted in said housing and adapted to be driven at a controlled speed; an elongated differential unit in said housing having an axial length substantially greater than the diameter thereof, said differential including an input gear, an output gear and a control gear; a hydraulic drive mounted in said housing closely adjacent and parallel to said differential, said hydraulic drive including two axial piston hydraulic units in back-to-back relation and connected to deliver motive fluid therebetween whereby one unit drives the other, means for varying the displacement of one of said units, gearing connecting one of said units to said control gear, gearing connecting the other of said units to one of said shafts, means for controlling the displacement varying means to control the speed of the output shaft, said housing means including a substantially flat mounting plate at one end thereof, said plate being perpendicular to the axis of said hydraulic drive and said differential and having a mounting surface facing the interior of said housing, and means on said surface for receiving and supporting one end of said hydraulic drive and said differential whereby the hydraulic drive and the differential may be stacked on the mounting plate during assembly, a charge pump adapted to deliver fluid to the inlet of one of said hydraulic units and connected to deliver control fluid to said displacement varying means, a scavenge pump for withdrawing leakage fluid from said housing interior connected to deliver fluid to said charge pump, both of said pumps being mounted on said mounting plate to facilitate assembly and conserve space in said confined envelope, said output shaft extending through a central opening in said mounting plate, a rotary governor mounted on said mounting surface with the axis thereof substantially parallel to said mounting plate, said governor connected to control said displacement varying means, a swirl chamber mounted on said surface of said mounting plate parallel to said hydraulic drive for deaerating the scavenge fluid, means connecting the outlet of the scavenge pump to the inlet of said swirl chamber, and means connecting the chamber to said charge pump.

References Cited

UNITED STATES PATENTS

| | | | |
|---|---|---|---|
| 2,485,126 | 10/1949 | Wood | 74—687 X |
| 2,517,188 | 8/1950 | Feng | 74—687 |
| 2,583,656 | 1/1952 | Lay | 74—687 |
| 2,599,814 | 6/1952 | Cull | 74—687 |
| 2,730,182 | 1/1956 | Sloane | 74—714 X |
| 2,890,604 | 6/1959 | Campbell | 74—687 |
| 2,994,233 | 8/1961 | Gerard | 74—687 |
| 2,995,049 | 8/1961 | Bolliger | 74—687 |
| 3,055,233 | 9/1962 | Giles | 74—687 |
| 3,095,757 | 7/1963 | Thoma | 74—687 |
| 3,122,025 | 2/1964 | Mark et al. | 74—687 X |
| 3,132,533 | 5/1964 | Baker | 74—687 |
| 3,199,376 | 8/1965 | De Lalilio | 74—687 X |
| 3,274,855 | 9/1966 | Gantzer et al. | 74—687 |

FOREIGN PATENTS

| | | |
|---|---|---|
| 915,271 | 10/1946 | France. |
| 1,078,399 | 3/1960 | Germany. |
| 362,999 | 12/1931 | Great Britain. |

OTHER REFERENCES

Starting Turbojets With Generator Drive, SAE Journal, March 1961, pp. 64–66.

DONLEY J. STOCKING, *Primary Examiner.*

DAVID J. WILLIAMOWSKY, THOMAS C. PERRY, *Examiners.*

J. R. BENEFIEL, *Assistant Examiner.*

UNITED STATES PATENT OFFICE
CERTIFICATE OF CORRECTION

Patent No. 3,365,981                                             January 30, 1968

Charles J. Gantzer

It is certified that error appears in the above identified patent and that said Letters Patent are hereby corrected as shown below:

In the heading to the printed specification, line 4, "a corporation of Illinois" should read -- a corporation of Delaware --.

Signed and sealed this 10th day of March 1970.

(SEAL)
Attest:

Edward M. Fletcher, Jr.                            WILLIAM E. SCHUYLER, JR.
Attesting Officer                                               Commissioner of Patents